United States Patent [19]
Baak et al.

[11] 3,857,719
[45] Dec. 31, 1974

[54] TREATMENT OF CLAYS
[75] Inventors: Tryggve Baak, Princeton, N.J.;
Dwight L. Harris, Yardley, both of Pa.
[73] Assignee: Cyprus Mines Corporation, Trenton, N.J.
[22] Filed: Sept. 13, 1973
[21] Appl. No.: 397,110

[52] U.S. Cl............ 106/288 B, 106/308 Q, 106/309, 106/72, 423/131
[51] Int. Cl............................................... C09c 1/42
[58] Field of Search...... 106/288 B, 308 Q, 72, 309; 423/131, 326

[56] References Cited
UNITED STATES PATENTS
| | | | |
|---|---|---|---|
| 2,758,010 | 8/1956 | Rowland | 423/124 |
| 3,399,960 | 9/1968 | Conley et al. | 423/131 |
| 3,423,223 | 1/1969 | Schultze | 106/309 |

Primary Examiner—Delbert E. Gantz
Assistant Examiner—J. V. Howard
Attorney, Agent, or Firm—Woodcock, Washburn, Kurtz & Mackiewicz

[57] ABSTRACT

Process and system for improving the brightness of clays to a point where the reflectance of light from the clay in dry form reaches a predetermined selected value. The process involves the formation of an agitated reaction mixture comprising an aqueous slurry of the clay and a decolorizing agent reactive with the impurities in the clay. The reaction mixture is maintained at a temperature sufficient to initiate and sustain the reaction and, as the reaction proceeds, at least a portion of the mixture is passed into a light reflectance measuring zone. Visible light is directed onto the mixture in the measuring zone and the magnitude of its reflectance from the mixture is measured. The measured value of reflectance is increased by reacting the decolorizing agent with the clay impurities until the measured value reaches a value representative of the predetermined selected value of the reflectance desired in the clay in dry form. Dry clay is then recovered from the reaction mixture having the desired brightness value. The system of the invention also provides means responsive to the magnitude of the reflectance of light from the clay slurry to regulate the rate of addition of the decolorizing agent into the reaction mixture. The invention provides a rapid, efficient means for monitoring and controlling the progress of the clay beneficiation reaction by measuring the light reflectance of the slurry, and avoids the time consuming steps of sampling, dewatering and drying of clay to obtain a sample for a brightness determination while the beneficiation process is being conducted, as was heretofore necessary in the prior art.

6 Claims, 1 Drawing Figure

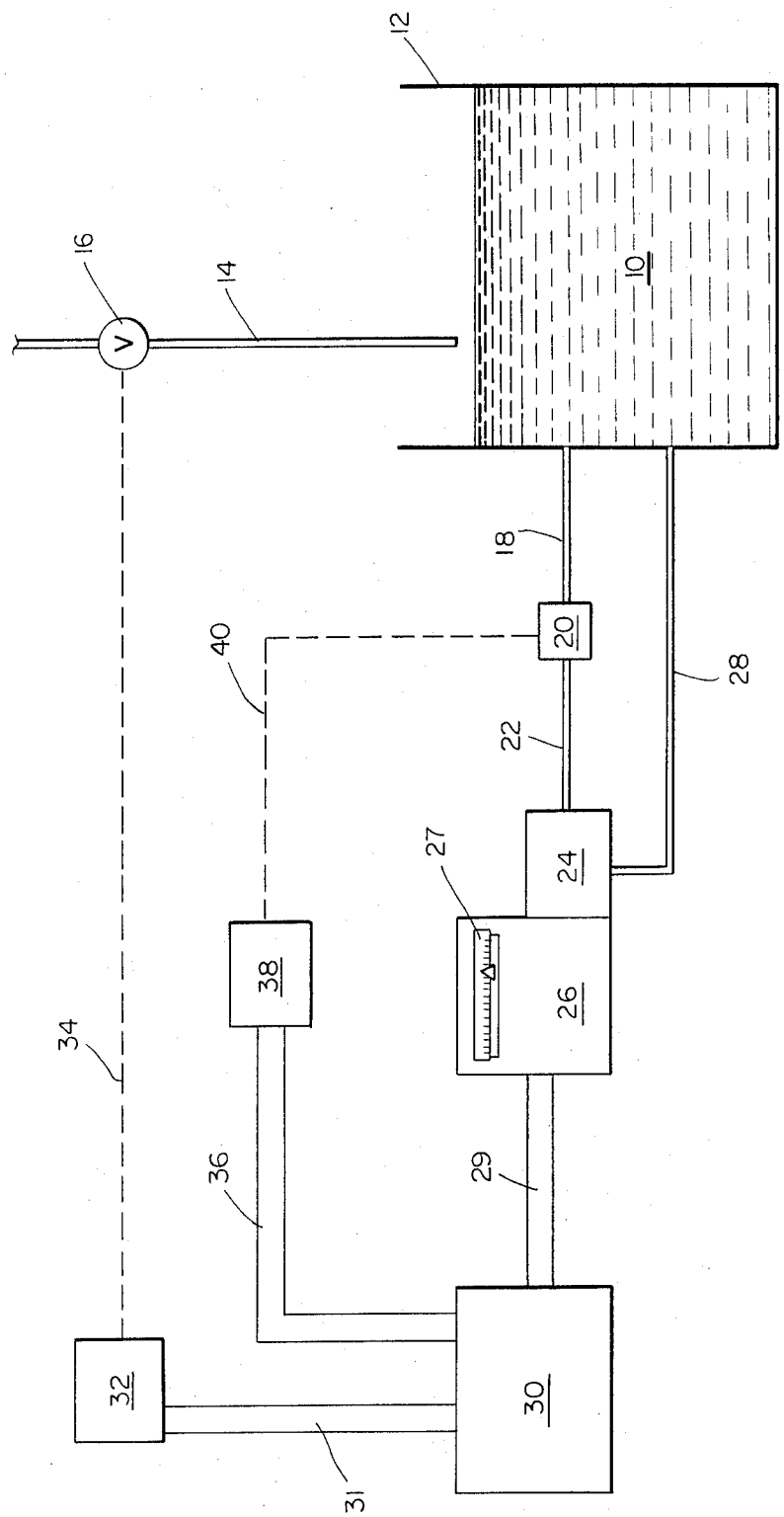

TREATMENT OF CLAYS

BACKGROUND OF THE INVENTION

1. Field of the Invention

This invention relates to a process and a system for decolorizing clays, and more particularly is concerned with the brightening of clay to a point where the reflectance of light from a clay in slurry form has a predetermined selected value which is representative of the brightness of clay in dry form.

2. Description of the Prior Art

Clays, especially refined kaolins, are employed in a variety of applications such as fillers for paper, paperboards, and plastic materials, and as basic ingredients in many ceramic products. To be suitable for use in these areas, it is necessary that the clay be highly reflective, i.e., that it be characterized by a high degree of brightness as measured on the basis of per cent of light reflectance in comparison to a standard, such as barium sulfate or magnesium oxide. The brightness of clays is conventionally and normally designated by a GE value determined according to TAPPI (Technical Association of the Pulp and Paper Industry) Method T 646 m-54, as reported in the Testing Methods—Recommended Practices — Specifications of Technical Association of the Pulp and Paper Industry.

By virtue of the fact that clays, as obtained from natural sources, are discolored, it has been found necessary to brighten them to attain the desired brightness level. Accordingly, many techniques have been developed to improve the brightness of clays, such as by chemical bleaching (both reducing and oxidizing), physical beneficiation to separate kaolinite from the colored impurities, such as titanium and iron oxides and mica, milling processes to delaminate kaolinite agglomerates and decrease particle size, and hydraulic classifications to fractionate particles according to settling rates. See, in this connection, U.S. Pat. No. 2,147,774 - Lyons; U.S. Pat. No. 2,754,273 - Shabaker; U.S. Pat. No. 2,974,054 - Beamesderfer, et al; U.S. Pat. No. 2,981,697 - Mickelson, et al; U.S. Pat. No. 3,116,973 - Haden; U.S. Pat. No. 3,290,161 - Sheldon, et al; U.S. Pat. No. 3,318,718 - Beamesderfer, et al; U.S. Pat. No. 3,432,030 - Oliver; U.S. Pat. No. 3,439,801 - Morris, et al; U.S. Pat. No. 3,446,348 - Sennett, et al; U.S. Pat. No. 3,536,264 - Helton, et al; and U.S. Pat. No. 3,573,943 - Rouse, et al.

Almost all of the processes that have been utilized in the brightening of clays are accomplished in aqueous slurries of the dispersed clays. However, the GE brightness measurement is determined at 457 nm (nanometers, i.e., meters $\times 10^{-9}$) wave length on the dry product of the process. This requires that a representative sample be removed from the slurry, dewatered, and the clay dried before the brightness reading can be taken and the progress of the decolorization process is known. Considerable delay time exists between processing time and brightness determination. Often the impurities in the clay will vary to a large extent, and the process will be incomplete, requiring the addition of more decolorizing agent to achieve the desired brightness level. Where large volumes of slurry are being processed, the delay time is a serious handicap since it directly affects the production rate of the clay having the desired brightness level.

It is accordingly a primary object of the invention to provide a reliable means for brightening clay in which the brightness of clay in the slurry form can be continuously monitored, and the decolorizing process regulated and terminated when the clay slurry brightness reached a predetermined selected value which is representative of the desired brightness level of clay in dry form.

SUMMARY OF THE INVENTION

Briefly stated, in accordance with the invention in one form, there is provided a process for brightening clay to a point where the reflectance of light from the clay in dry form has a predetermined selected value, which comprises forming an agitated reaction mixture comprising an aqueous slurry of said clay and a decolorizing agent reactive with the impurities in said clay, maintaining said reaction mixture at a temperature sufficient to initiate and sustain the reaction between said decolorizing agent and said impurities, directing light in the visible wave length region onto at least a portion of said slurry, measuring the magnitude of the reflectance of said light by said slurry, increasing the measured value of the reflectance of said light by said slurry by reacting said decolorizing agent with said clay impurities until said measured value reaches a value representative of said predetermined value, and recovering from said slurry dry clay characterized by a light reflectance of said predetermined selected value.

The process of the invention eliminates the fundamental limitations of the prior art methods of decolorizing clay and determining the brightness level attained as the decolorizing process proceeds. The process of the present invention enables a rapid determination of the brightness level of the clay while it is in slurry form, and thereby affords a rapid and convenient means for monitoring the decolorizing reaction.

In accordance with one form of the invention, the rate of addition of the decolorizing agent to the aqueous reaction mixture can be controlled in direct response to the change in the brightness of the clay undergoing treatment, and the decolorizing process can be terminated when the desired level of brightness is attained, without the necessity of dewatering a representative sample of the slurry, drying the clay and measuring the brightness of the dried sample. The invention thus provides a more satisfactory means for determining the rate, as well as the extent, of the decolorizing of clay, and provides a rapid and reliable method for determining the progress of the beneficiation process.

The present invention takes advantage of the unexpected discovery that a definite correlation exists between the magnitude of the reflectance of visible light from an aqueous clay slurry and the magnitude of reflectance of the visible light from the clay in that slurry which has been dried and is in powdered form. As a result of this correlation, calibration curves establishing the relationship between the reflectance value of the slurry and the reflectance value of the dry clay can be empirically determined for each type of clay that is decolorized with a particular type or types of decolorizing agents. This may be accomplished by taking a representative sample of the slurry, measuring its reflectance, and subsequently drying the sample and measuring the reflectance of the dry clay in that sample. By repeating this procedure over the period of the decolorizing reaction, calibration curves can be established. These calibration curves will then be useful in subsequent decolorizing process wherein the improvement in the brightness of the clay during the process can be monitored by measuring the magnitude of light reflectance from the aqueous slurry during the beneficiation reaction.

In accordance with the invention the clay is slurried in water to provide an aqueous slurry having a solids content of from about 5% to about 75% and preferably from about 10 to about 40% by weight of clay. Thereafter, the slurry is agitated and, if desired, a minor amount of a dispersant (e.g., 0.2 weight percent, based on the weight of the dry clay) can be added. To this slurry is added the desired decolorizing agent for reaction with the clay impurities to cause an increase in the brightness of the clay. The clay slurry including the decolorizing reagent is agitated to assure a thorough reaction between the clay impurities and the decolorizing reactant.

In general, any of the chemical bleaching agents, both reducing and oxidizing, may be used in the practice of the invention. Examples of suitable reducing agents include the alkali, alkaline earth metal and ammonium bisulfites, particularly the sodium, potassium, lithium, magnesium and zinc and ammonium bisulfites, and more particularly the alkali metal bisulfites. The bisulfites may have associated in them substantial amounts of sulfites of ammonia or one of these metals without detriment. At the appropriate pH values, 2.0 to 5.0, the sulfite will convert to the bisulfite. Examples of suitable oxidizing bleaching agents are the hypochlorites of various alkali and alkaline earth metals (e.g. sodium and calcium hypochlorite) used at neutral or basic pH values, i.e., from 7.0 to 9.0. Other well known decolorizing agents will readily occur to those skilled in the art.

The pH of the reaction mixture, i.e., the clay slurry containing the decolorizing agent, can be easily adjusted to the desired value depending upon whether an acid or basic system is to be employed.

The temperature of the slurry employed in the practice of the invention may vary widely and generally will range from about 30°F. to about 210°F. Generally speaking, the slurry can be maintained at ambient temperatures. Where elevated temperatures are used, the decolorizing process will proceed more rapidly. Operation at lower temperatures, i.e., below 60°F., is useful where it is not desired to install heating equipment. Slurry temperatures above 210°F. may tend to decompose the reactive decolorizing materials, and are generally unsuitable from an economic standpoint. As will be appreciated by those skilled in the art, the process of the invention can be practiced in either continuous or batch fashion.

In accordance with the invention, a portion of the clay slurry including the decolorizing agent, i.e., the aqueous reaction mixture, is passed into a light reflectance measuring zone where the reflectance of the visible light from the slurry sample is measured. The reflectance measurements may be obtained using a Baush and Lomb Spectronic 505 spectrophotometer using a reflectance attachment with traps installed to stop specular reflectance. The Spectronic 505 is a double beam instrument with continuous balancing between the standard and test sample. The standard, a dry $BaSO_4$ powder, for example, may be calibrated at 100% reflectance for use with slurry test samples varying from 10–95% reflectance. GE brightness readings are advantageously noted using 457 nm wave length light. However, visible light, in the range of from 360 nm to 660 nm can be used. The light used may, if desired, be of a single wave length or of multiple wave lengths.

We have also discovered that the pulp density level, or solids content of the slurry, is not critical. Transmittance values observed on a Ruoy photometer with one cm light path at 520 nm showed zero transmittance for slurry densities greater than 0.6% solids. Reflectance values were not affected by changes in the pulp densities for 10–30% solids. Accordingly, it has been found preferable to practice the process of the invention and make the tests to provide the correlation curves between dry powder and slurry reflectance values using slurries having a solids content within that range.

DESCRIPTION OF THE DRAWING AND PREFERRED EMBODIMENTS

For further objects and advantages of the invention and for a more detailed discussion of preferred embodiments thereof, reference is to be made to the following description taken in conjunction with the drawing which is a schematic diagram illustrating a system embodying the present invention.

Clay slurries were made by dispersing about 75 grams of clay in 450 ml water with the aid of sodium silicate or tetra sodium pyrophosphate, 0.2% by weight of clay. The slurry was placed in the reactor and a spectrophotometer scan was made of the slurry. Then the slurry was made acid to a pH of 3.0 with sulfuric acid and/or phosphoric acid, and another spectrophotometer scan was made. The bleaching agent, sodium hydrosulfite for reducing reaction was added and spectrophotometer scans were made at given intervals of time until the bleaching action was nearly completed. In certain cases the bleached slurry was filtered and dried and the dry powder was also scanned in the spectrophotometer. The dry powder feed could also be scanned for comparison to the slurry scan and bleached powder. Observation of the difference between dry powder reflectance and aqueous slurry reflectance shows a substantial decrease in the reflectance for the slurry compared to the dry powder. A similar procedure was followed for the oxidizing bleaching using hypochlorite except that the pH was not made acid, i.e., was of the order of 8.0. Results are noted in Table I below for four wave lengths, 360 nm, 457 nm, 550 nm and 640 nm, on a scale of 100% reflectance for $BaSO_4$. Clay slurry values were found to be about one-half of the value of the reflectance of the dry powder at the low wavelength range.

TABLE I

PERCENT REFLECTANCE

| | 360 nm | | 457 nm | | 550 nm | | 640 nm | |
|---|---|---|---|---|---|---|---|---|
| Sample | Dry | Slurry | Dry | Slurry | Dry | Slurry | Dry | Slurry |
| A | 54 | 21 | 83 | 58 | 89 | 70 | 92.3 | 74.8 |
| B | 53 | 20 | 81 | 50 | 90 | 65.5 | 91.0 | 70.0 |

TABLE I—Continued

PERCENT REFLECTANCE

| Sample | 360 nm | | 457 nm | | 550 nm | | 640 nm | |
|---|---|---|---|---|---|---|---|---|
| | Dry | Slurry | Dry | Slurry | Dry | Slurry | Dry | Slurry |
| C | 51.5 | 17 | 79 | 48.5 | 85 | 61 | 91.5 | 71.5 |

Sample A - Slurry composed of paper coater type kaolinite clay.
Sample B - Slurry composed of medium brightness filler clay, i.e. kaolinite clay which does not bleach to 85% brightness value at 457 nm.
Sample C - Slurry composed of a medium brightness filler clay (kaolinite), different from clay of Sample B.

A test run to measure stability of the spectrophotometer over a period of about 7 hours showed a variation of approximately ±0.35% at 460 nm, ±0.39% at 540 nm, and ±0.38% at 920 nm. Consequently, the test result runs of several hours duration were considered to be sufficiently stable for measuring reflectance changes varying from 1–10% units for bleaching.

Referring now to the drawing, a clay slurry 10 is prepared by dispersing the clay in water contained in a reservoir vessel or slurry tank 12 which is fitted with a suitable agitating device (not shown) to agitate the slurry during the beneficiation reaction. The decolorizing agent is added to the slurry 10 via the pipe 14, including a flow control means or valve 16. As the decolorizing agent is added to the agitated slurry, the reaction between the decolorizing agent and clay impurities commences, causing the brightness of the clay (and, consequently, of the slurry) to increase. The temperature of the slurry is maintained at a temperature suitable to sustain the reaction in the aqueous reaction mixture in the tank 12. As the reaction proceeds, a sample of the slurry is pumped out of the tank 10 via pipe 18 by means of pump 20 and through pipe 22 into a light reflectance measuring zone 24. A light reflectance measuring means, or spectrophotometer, 26 is cooperatively associated with the measuring zone 24 to direct light of a predetermined wave length onto the slurry in the measuring zone 24, and to measure the magnitude of the reflectance of such light from the slurry in the zone 24. The measuring zone 24 is also provided with a suitable outlet pipe 28 permitting the slurry to be returned to the slurry tank 12.

The spectrophotometer 26 generates a signal representative of the reflectance of the slurry in the measuring zone the magnitude of which is displayed on the display device 27. The magnitude of the reflectance of the slurry, as above noted, is also representative of the magnitude of the reflectance of the clay in dry form.

The signal generated by the light reflectance measuring means 26 is also transmitted via the connecting cable 29 to the control unit 30 which provides automatic control of the valve 16 which regulates the rate of flow of the decolorizing agent into the slurry tank 12 via the pipe 14. Signals from the control unit 30 are transmitted through the connecting cable 31 to the valve activator 32 which positions the valve 16 by means of the linkage 34.

The control unit 30 also provides automatic control over the pump 20 which directs a slurry sample into the measuring zone 24. A signal from a programming means contained in the control unit 30 is transmitted through the cable 36 to the pump activator 38 which, in turn, operates the pump by means of the linkage 40.

The programming means may comprise an electric timing switch driven by a clock motor. The activator may contain a rotary solenoid mechanism.

In accordance with the invention, the reaction between the decolorizing agent on the impurities in the clay is permitted to continue until the magnitude of the reflectance of the clay slurry as measured by the spectrophotometer reaches a value which is representative of the predetermined selected value desired in the final clay product. The reaction is at that point terminated and the clay separated from the slurry by any one of the well known methods such as filtration, centrifugation, pressing and the like. Following the separation of the clay from the slurry, the clay may be dried at a temperature which will remove essentially all of the water. The resulting dried clay product will be characterized by the predetermined selected brightness value that was desired.

As will be appreciated by those skilled in the art, the present invention affords a rapid and reliable means for brightening clay in which the brightening of the clay in slurry form can be continuously monitored and the decolorizing reaction appropriately controlled and terminated when the clay slurry brightness reaches a predetermined selected value which is representative of the desired level of brightness of the clay in dry form.

Although the present invention has been described in considerable detail with respect to certain embodiments thereof, it should be understood that the invention is not deemed to be so limited and is to be interpreted by the scope of the appended claims.

What is claimed is:

1. A process for brightening clay to a point where the reflectance of light from said clay in dry form has a predetermined selected value, which comprises:
   forming an agitated reaction mixture comprising an aqueous slurry of said clay and a decolorizing agent reactive with the impurities in said clay,
   maintaining said reaction mixture at a temperature sufficient to initiate and sustain the reaction between said decolorizing agent and said impurities,
   directing visible light onto at least a portion of said slurry,
   measuring the magnitude of the reflectance of said light by said slurry,
   increasing the measured value of the reflectance of said light by said slurry by reacting said decolorizing agent with said clay impurities until the measured value reaches a value representative of said predetermined value, and
   recovering from said aqueous reaction mixture dry clay characterized by a light reflectance of said predetermined selected value.

2. A process for brightening clay to a point where the reflectance of light from said clay in dry form has a predetermined selected value, which comprises:

agitating an aqueous slurry of said clay including a solids content of from about 5% to about 75% by weight, adding to said agitated slurry a predetermined amount of a decolorizing agent reactive with the impurities in said clay to form an aqueous reaction mixture, maintaining said reaction mixture at a temperature of from about 35°F. to about 210°F. sufficient to initiate and sustain the reaction between said decolorizing agent and said impurities, passing at least a portion of said aqueous reaction mixture into a light reflectance measuring zone, directing light characterized by a wave length of from 360 nm to 660 nm onto said aqueous reaction mixture in said zone, measuring the magnitude of the reflectance of said light by said aqueous reaction mixture, increasing the measured value of the reflectance of said light by said aqueous reaction mixture by reacting said decolorizing agent with said clay impurities until said measured value reaches a value representative of said predetermined selected value, and recovering from said aqueous reaction mixture dry clay characterized by a light reflectance of said predetermined selected value.

3. The process of claim 1 including the additional step of adjusting the pH of said reaction mixture to optimize the efficiency of said reaction.

4. The process of claim 1 including the step of adding additional decolorizing agent to said slurry to increase the measured value of the reflectance of the light by said slurry.

5. The process of claim 1 wherein the decolorizing agent is an oxidizing bleach.

6. The process of claim 1 wherein the decolorizing agent is a reducing bleach.

* * * * *